United States Patent Office 3,409,033
Patented Nov. 5, 1968

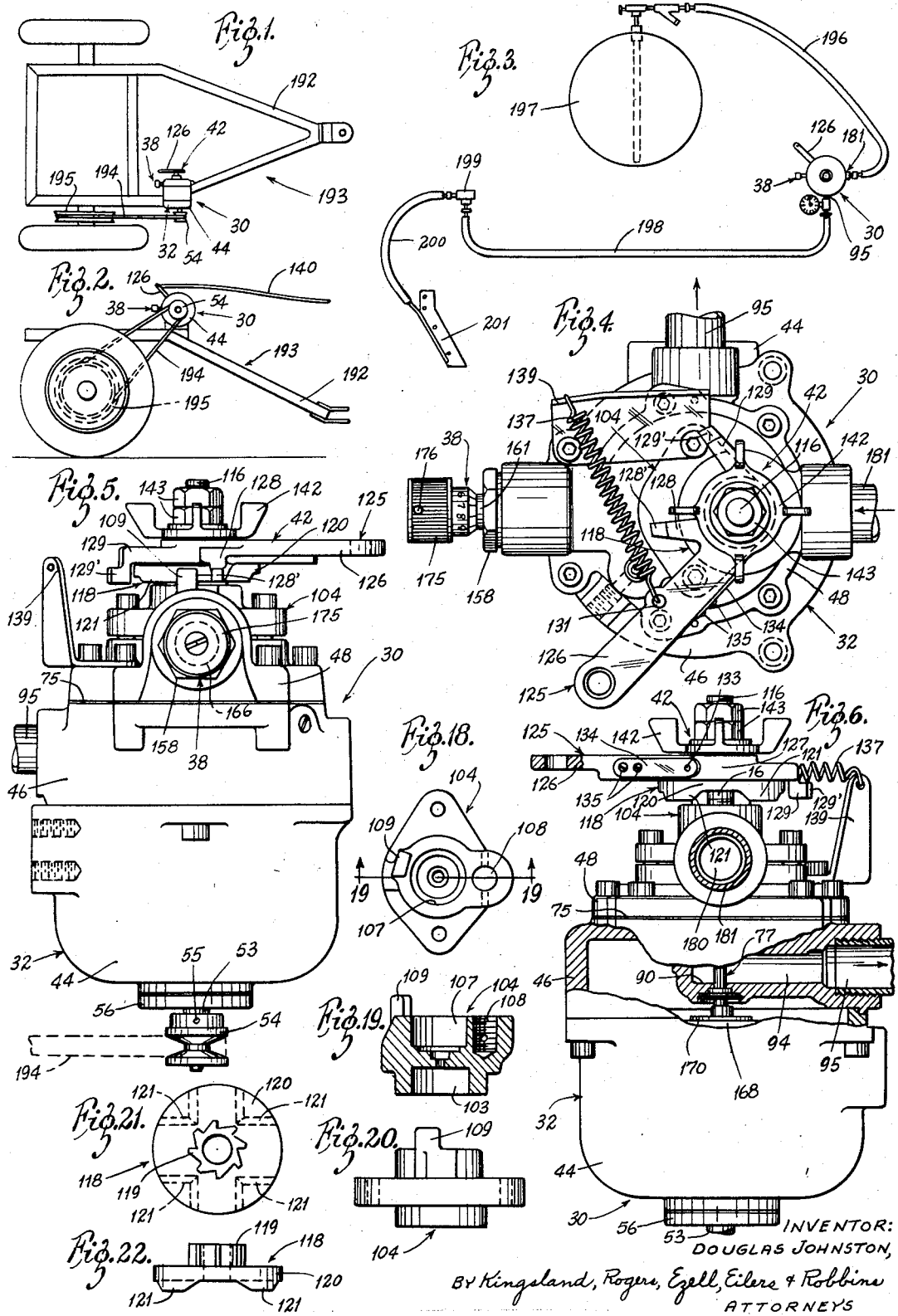

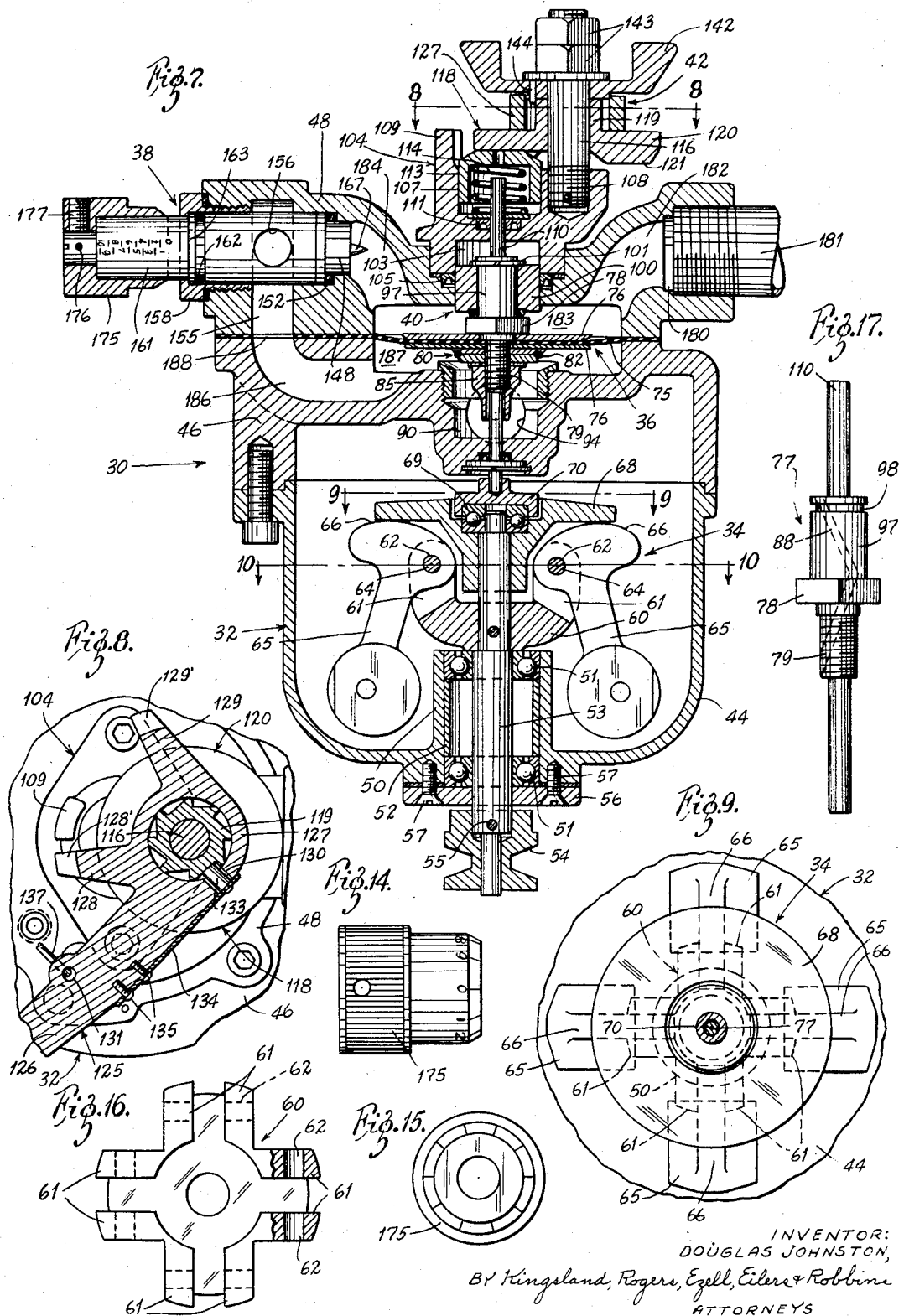

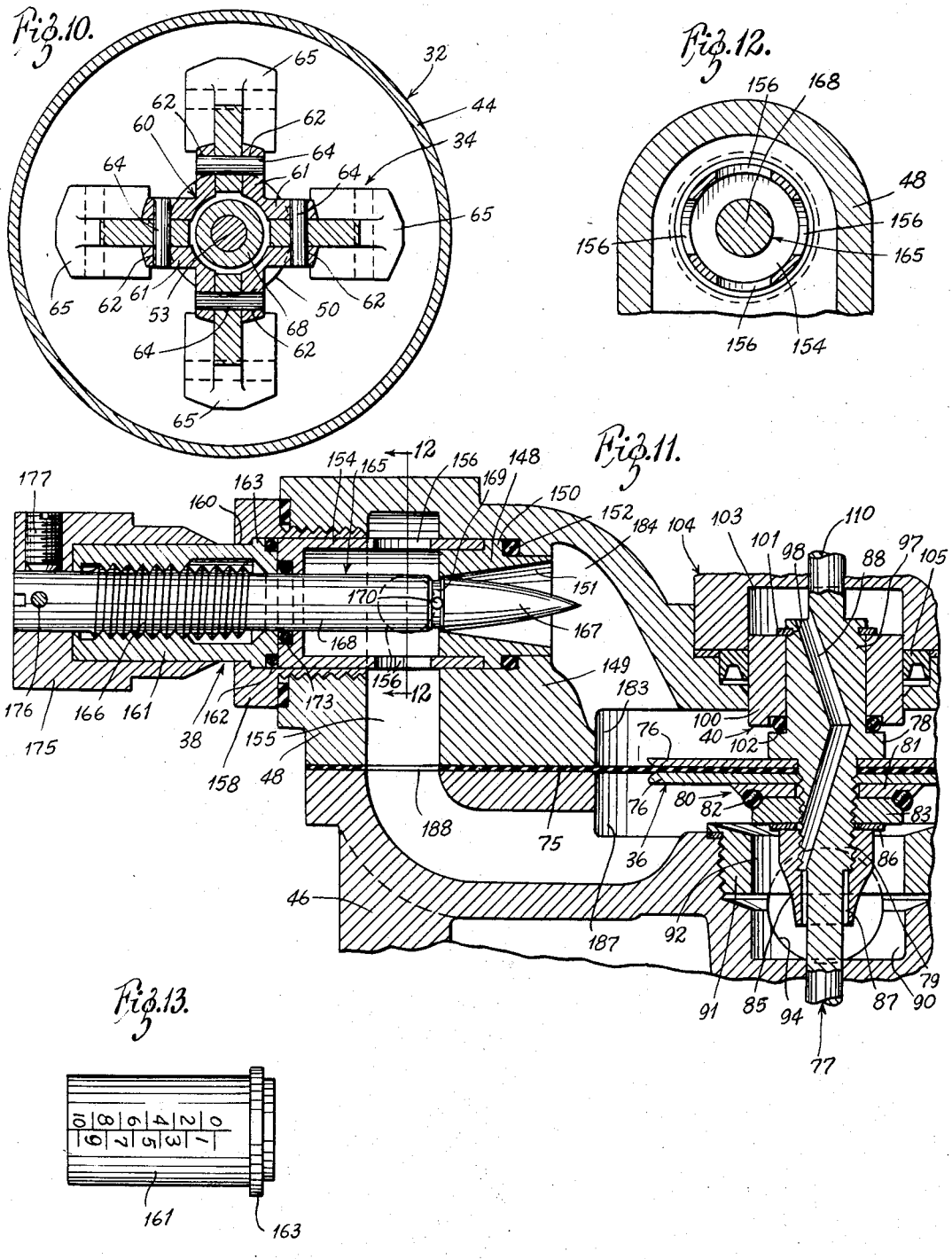

3,409,033
LIQUID FLOW CONTROL STRUCTURE
Douglas Johnston, Athens, Ala., assignor to Decatur Foundry & Machine Co., Inc., Decatur, Ala., a corporation of Alabama
Filed Dec. 30, 1964, Ser. No. 422,217
12 Claims. (Cl. 137—51)

ABSTRACT OF THE DISCLOSURE

A flow control structure adapted to be mounted on a wheeled applicator to receive and discharge anhydrous ammonia, and the like, in predetermined quantities proportional to the speed of the applicator, comprising a housing, a diaphragm in the housing separating a space into an upper chamber and a lower chamber, the upper chamber receiving anhydrous ammonia at substantially tank pressure, a passage communicating the upper and lower chambers having an adjustable calibrated valve therein for controlling the flow, a discharge valve in the lower chamber connected to the diaphragm for movement therewith, and a governor mounted in the housing below the lower chamber operatively connected to the discharge valve and the diaphragm for exerting a force upon the diaphragm proportional to the square of the speed of the applicator on which the structure is mounted, the governor including a pulley adapted to be connected to the wheels of the applicator so that the speed of the governor is proportional to the speed of the applicator, the governor initially opening the valve in the lower chamber on movement of the applicator, the operating position of the valve thereafter at a given speed of the applicator being determined by a balance of the force of the governor on the diaphragm and the pressure drop across the diaphragm through the valved connecting means, the pressure drop depending upon the speed of the governor.

---

The present invention relates generally to flow control, and more particularly to novel structure for and a method of controlling the flow of anhydrous ammonia distributed by a wheeled or equivalent applicator from a tank into the ground.

Shortly after World War II, there was a shortage of solid or granular nitrogenous type of fertilizers, but there was a tremendous oversupply of anhydrous ammonia coming from plants that had been built to furnish this chemical for the manufacture of high explosives.

As a result of research work done at Mississippi State University by Dr. W. B. Andrews, it was proven that anhydrous ammonia could be injected directly into the soil with little or no loss, and that this chemical would supply the nitrogen requirements for growing plants, without converting it into the solid form, which is expensive and time consuming.

As soon as the results of this work were released to the public, farmers from all over the central area of the South began learning all they could about ammonia and equipment necessary for the application of anhydrous ammonia to their crops.

At this time, no satisfactory metering and applicating equipment was available and many farmers, with the help of experimental stations, made up homemade ammonia applicators, none of which had accurate metering equipment, and most of them were dangerous. Within the next several years, a number of manufacturers devised equipment for metering ammonia.

The first device was no more than an ordinary air line regulator made of materials that would not be attacked by ammonia. This device employed an orifice at each outlet to the ground and it was thought that if one set the regulator to hold a constant pressure on the orifice that one could obtain an even application over a field, provided one operated at a constant speed.

The trouble with this device was the fact that as the temperature changed throughout the day, the ammonia in the tank changed pressure, which required constant resetting of the regulator in order to hold a fixed pressure on the orifices. Another disadvantage was the fact that the orifice itself had to be changed if there was a big change in output required, since flow through an orifice is such that in order to double the flow, the pressure has to be increased four times.

Still another disadvantage was the fact that the ammonia flashed into gas as it went through the regulator, and with the tank pressure changing with the temperature, it was impossible to maintain a constant liquid-gas ratio, even though the pressure remained constant. The output was erratic and undependable.

Another cause of serious inaccuracy in the first pressure regulator systems was the fact that the back pressure on the downstream side of the orifice varied with output, and also varied with weather conditions, soil compaction, length of hose, and other factors, so that even though one could accurately control the upstream pressure, one had no way of knowing or controlling the downstream pressure.

Within a few years these regulator systems were improved considerably. While the first regulators maintained a constant pressure on a fixed orifice, regardless of tank pressure, later regulators were designed to maintain a constant small differential pressure across a single orifice with a variable and calibrated opening.

The first regulators, upstream from the orifice, might have expanded the liquefied gas from a tank pressure of between 50 and 250 p.s.i. to an orifice pressure of perhaps 30 p.s.i.

Obviously expanding from 250 p.s.i. to 30 p.s.i. would cause a far greater gas to liquid ratio than in expanding from 50 p.s.i. to 30 p.s.i. Therefore, since the gas to liquid ratio was uncontrollable and not known, these regulators were highly inaccurate for this reason alone, since the flow rate through an orifice at constant pressure is reduced as the ratio of gas to liquid increases.

Present day regulators, by means of a spring loaded diaphragm, maintain a constant differential pressure across the variable orifice with pure liquid at full tank pressure entering the orifice. At 10 p.s.i. differential presure, liquefied ammonia at full tank pressure of 250 p.s.i. may enter the orifice, fully liquid, and the diaphragm controlled outlet valve would maintain the downstream orifice pressure at 240 p.s.i., a differential of 10 p.s.i.

Under another tank pressure of 50 p.s.i., liquefied ammonia may enter the orifice at 50 p.s.i. with a 40 p.s.i. downstream orifice pressure maintained by the diaphragm controlled outlet valve.

Even though the tank pressure varies extremely pure liquid enters the orifice at full tank pressure and since the expansion through the orifice is small and constant, the gas to liquid ratio has little, if any, effect on accuracy.

All present day differential regulators use a spring to control the differential pressure, and the accuracy is limited by the number of coils in the spring, since as the flow increases, the outlet valve must rise higher and the spring force decreases unless it has an infinite height and number of coils. Also, the accuracy of this device depends on operating the tractor or vehicle at a constant speed, which is practically impossible, since many fields have steep hills and low and wet spots that cause the tractor to slow down or the tires to slip.

Another method of metering anhydrous ammonia was introduced in about 1950. This device consisted of a positive displacement, variable stroke pump that was driven from the ground wheel by a chain. This device required a heat exchanger to condense any gas formed in the inlet line to the pump in order to avoid the possibility of the pump completely gas-locking at low settings, where the clearance volume in the pump may exceed the displacement setting.

These so-called pumps require a discharge valve for each end of the cylinder, loaded by means of a diaphragm or piston with the tank pressure, so that at high tank pressures, the ammonia would not simply just flow through the pump. These balanced discharge valves, for practical reasons, actually had to be heavily overbalanced to prevent the ammonia from leaking through them, which builds up excessive loads on the pump mechanism and the chain drive.

For this reason last mentioned above, and on account of the many moving parts in an ammonia metering pump, they were found to be very difficult and expensive to maintain, requiring a heavy initial investment in the pump and an expensive drive. The large power requirement of the pump continuously cause difficulty with ground wheel slippage and rapid replacement of the chains and sprockets and other parts in the pump.

For this reason, the use of pumps has gradually declined in favor of the differential pressure regulator, although the industry has for many years looked forward to a metering device with the simplicity and low cost of the differential regulator, but with the ground speed-controlled output of a pump.

Hence, a main object of the present invention is the provision of a solution to the aforesaid long existing problem by providing a means and a method of metering anhydrous ammonia at a rate proportional to the ground speed of or the distance traveled by the applicator which eliminates the heavy and cumbersome drive and the many moving parts of a pump that are so difficult to maintain.

Briefly, the present invention includes a differential regulator with back pressure balance piston and a centrifugal governor driven by the wheels of an applicator or equivalent that applies force to accurately control the flow proportional to the speed. The centrifugal governor is designed so that at a given speed, the force on a diaphragm spindle operatively connected to a diaphragm is constant, regardless of the lift of an outlet valve or the position of the governor. An adjustable metering valve is provided, as is an outlet valve which is maintained in predetermined open position when the control is in operation. A manually operable cut-off unit is provided for shutting off the flow of anhydrous ammonia when turning the applicator at row ends.

Therefore, another object is to provide a novel anhydrous ammonia flow control structure for ground applicators which accurately meters such liquid so that substantially the same amount of the liquid is applied per selected ground increment regardless of the operating speed of the applicator.

Another object is to provide a novel anhydrous ammonia flow control structure for ground applicators which is very light in weight and which replaces structures weighing hundreds of pounds, thereby adding to the effective pay load.

Another object is to provide a novel anhydrous ammonia flow control structure for ground applicators which reduces maintenance costs both in respect to repairs and replacement and reduces downtime to a minimum.

Another object is to provide a novel anhydrous ammonia flow control structure for ground applicators which reduces the initial investment in equipment.

Another object is to provide a novel anhydrous ammonia flow control structure for ground applicators which leaves the applicator operator free to handle the tractor, or the like.

Another object is to provide a novel method of accurately applying anhydrous ammonia into the ground at a constant rate per ground increment regardless of the ground speed of the applicator.

The foregoing and other objects and advantages are apparent from the following description taken with the accompanying drawings, in which:

FIGURE 1 is a diagrammatic plan view of the frame of a simple two-wheeled applicator, showing the present flow control structure operatively mounted thereon;

FIGURE 2 is a side elevational view thereof;

FIGURE 3 is a diagrammatic side elevational view showing the present novel flow control structure operatively connected to a tank of anhydrous ammonia and to a ground applicator knife;

FIGURE 4 is a top elevational view of a flow control structure incorporating the principles of the present invention;

FIGURE 5 is a side elevational view thereof, at ninety degrees counterclockwise of FIGURE 4, the manual shut-off lever spring being omitted;

FIGURE 6 is a side elevational view thereof at ninety degrees clockwise of FIGURE 4, parts being in section for illustration of details;

FIGURE 7 is an enlarged horizontal cross-sectional view through the present flow control structure;

FIGURES 8, 9 and 10 are vertical cross-sectional views on substantially the lines 8—8, 9—9 and 10—10 of FIGURE 7;

FIGURE 11 is a further enlarged fragmentary horizontal cross-sectional view through the orifice assembly including the metering needle-diaphragm assembly, and the discharge valve;

FIGURE 12 is a vertical cross-sectional view taken on substantially the line 12—12 of FIGURE 11;

FIGURE 13 is an exterior view of the internally threaded barrel which receives the metering needle;

FIGURE 14 is a side view of the rotatable thimble or knob for adjusting the metering needle to the selected position;

FIGURE 15 is an end view thereof;

FIGURE 16 is a slightly enlarged view of the governor spider, parts being in cross section for illustration of detail;

FIGURE 17 is a view of the diaphragm stem;

FIGURE 18 is a plan view of the handle cap;

FIGURE 19 is a cross-sectional view taken on substantially the line 19—19 of FIGURE 18;

FIGURE 20 is an end view of the handle cap;

FIGURE 21 is a plan view of the handle ratchet; and

FIGURE 22 is an end view thereof.

Referring to the drawings more particularly by reference numerals, 30 indicates generally a flow control structure incorporating the teachings of the present invention. Broadly, the flow control structure 30 includes a multi-part housing 32, a centrifugal governor 34, a diaphragm assembly 36, an adjustable orifice assembly 38, an exhaust valve 39, a back pressure balance piston unit 40, a rope operated ratchet valve 42, essential connecting passages, and suitable bearings and coordinating parts. For purposes of description, the ratchet valve 42 will be considered at the top and the governor 34 at the bottom of the flow control structure 30, see FIGURES 7 and 11.

The multi-part housing 32 includes a bottom cup-shaped governor housing section 44, a central body section 46, and a top meter cap section 48 in which is mounted the adjustable orifice assembly 38 and on which is located the rope-operated ratchet valve 42 (FIG. 7). Said three sections are of the configurations clearly shown in the drawings.

The governor housing section 44 includes an integral bearing sleeve 50 within which are operatively mounted roller bearings 51 separated by a cylindrical bearing spacer 52. A vertical governor spindle 53 is rotatably supported by the bearings 51 and also extends below the governor housing section 44, receiving a pulley 54 thereon which is secured thereto by a suitable pin 55. A housing cap 56 closes the bearing opening, being secured to the governor housing section 44 by suitable screws, a shim 57 encircling the outer bearing 51. Within the governor housing section 44 and pinned to the governor spindle 53 is a governor spider 60 having four pairs of spaced arms 61 having aligned openings 62 therethrough (FIGS. 7 and 16). Suspended between each pair of spaced arms 61 by a pin 64 is a governor weight 65. Freely mounted on the governor spindle 53 above the spider 60 is a cam plate follower 68 which is in engagement with the cam portions 66 of the governor weights 65 (FIGS. 7 and 9). The cam plate follower 68 supports a thrust bearing 69 in position about the upper reduced tip of the governor spindle 53, a thrust cap 70 engaging the thrust bearing 69, as shown in FIGURE 7.

The diaphragm assembly 36 includes a diaphragm 75 which is secured between the body section 46 and the meter cap section 48, as is clear from FIGURE 7. A major portion of the free part of the diaphragm 75 is clamped between two washers or plates 76. A diaphragm stem 77 of the configuration shown in FIGURES 7, 11 and 17 extends upwardly from the thrust cap 70 through the diaphragm 75 and washers 76, the upper washer 76 engaging the lower face of an annular flange 78 of the diaphragm stem 77 and the bottom washer 76 threadedly engaging a threaded portion 79 thereof.

Adjacent the lower threaded washer 76 is an outlet O-ring valve 80 including a top valve washer 81 having an annular channel in which is disposed an O-ring 82 (FIG. 11). Adjacent the top valve washer 81 is a bottom valve washer 83 of the cross-section shown which threadedly engages the threaded portion 79 of the diaphragm stem 77 securing the O-ring 82 in position and the valve washer 81 against the adjacent diaphragm washer 76. To insure maintained engagement of the aforesaid parts, there is provided a diaphragm nut 85 which engages the threaded portion 79 and forces a washer 86 against the valve washer 83, as is clear from FIGURE 11. The diaphragm nut 85 has a lower cup portion 87 of a diameter larger than the lower portion of the diaphragm stem 77 which vents a passageway 88 in the diaphragm stem 77. The body section 46 includes a generally centrally disposed well 90 in which the diaphragm nut 85 is disposed and through which the lower part of the diaphragm stem 77 extends. Forming the top portion of the well 90 is a valve seat unit 91 which is threaded into the body section 46, as is illustrated clearly in FIGURE 11. The valve seat unit 91 includes a cylindrical bore 92 into which the valve washer 83 is adapted to enter when in closed positions. A gas tight seal is formed as the O-ring 82 seals against the upper rim or valve seat 93 of the cylindrical bore 92 of the valve seat unit 91 as the washer 83 enters the bore 92. The purpose of the washer 83 entering the bore 92 ahead of the O-ring 82 is, upon opening it is desirable to avoid substantial flow through the outlet valve seat unit 91 until the O-ring 82 has risen to some distance thereabove. The reason for this is that the O-ring 82, being relatively soft, may change its volume or shape with temperature and exposure to ammonia, thereby changing the effective area of the outlet valve, which for accuracy must be exactly equal to that of a balance piston described below. The change in effective outlet valve area with changes in volume and shape of the O-ring 82 would be caused mainly by venturi effects of the fluid flow between the O-ring 82 and the valve seat 93. A discharge passage 94 leads from the well 90, the outer end of which threadedly receives a fitting 95 through which anhydrous ammonia passes enroute to suitable orifices in knives passing through the soil (FIGS. 6 and 11).

The diaphragm stem 77 also includes a cylindrical portion 97 having an annular groove 98 therein (FIG. 17). Mounted on the cylindrical portion 97 is a balance piston 100 which is maintained in position by a snap ring 101 and sealed at the other end by an O-ring 102 (FIGS. 7 and 11).

The balance piston 100 is reciprocatable in a well 103 forming part of a handle cap member 104 (FIGS. 7, 11, 18 and 20). The handle cap member 104 is mounted in an annular depression formed in the meter cap section 48 of the multi-part housing 32. A block V-ring seal 105 effectively seals the balance piston 100 externally. It will be noted from FIGURE 11 that the passageway 88 opens into the cup 103, thereby connecting the area therein closed off by the balance piston 100 with the discharge well 90.

It will be noted that the handle cap member 104 also includes a well 107 above the well 103, a threaded well 108 of smaller diameter than the well 107, and a stop finger 109 (FIGS. 7, 19 and 20). A reduced end portion 110 of the diaphragm stem 77 extends through an opening in a web separating the wells 103 and 107 and into the latter, being sealed by a block V-ring seal 111. Within the well 107 for reciprocative movement is a cam follower 113 which is biased upwardly by compression spring 114. A handle stud 116 is threadedly mounted in the threaded well 108. An integral handle ratchet and cam member 118 is rotatably mounted on the handle stud 116, which includes a ratchet portion 119 and an annular disc-shaped cam portion 120 having opposed pairs of depending cams 121 (FIGS. 7, 21 and 22).

Surrounding the ratchet portion 119 and rotatable against the upper flat surface of the annular disc portion 120 is a valve handle member 125 of the configuration shown in FIGURES 4, 5, 7 and 8. The valve handle member 125 includes a handle portion 126, a hub portion 127 which surrounds the ratchet portion 119, stop arms 128 and 129, an opening 130, and an aperture 131. A ratchet pawl 133 is mounted on the free end of a flat spring 134 secured by suitable screws 135 to one side of the arm portion 126 and extends through the opening 130 into engagement with the teeth of the ratchet portion 119 (FIG. 8). A tension spring 137 has one end hooked through the aperture 131 and the other end engaging a bracket 139 mounted by suitable bolts on the meter cap section 48. A suitable rope or chain 140 is connected to the free end of the handle portion 126. Each arm 128 and 129 has a downwardly off-set thumb portion 128' and 129', respectively, which alternately engage the stop 109, the thumb portion 129' engaging the stop 109 upon the handle portion 126 being pulled by an operator through the rope 140. The tension spring 137 reverses the aforesaid movement of the handle portion 126 to return it to starting position, biasing the thumb portion 128' into engagement with the stop 109. The ratchet pawl 133 simply rides over the teeth of the ratchet portion 119 as the handle portion 126 is spring-returned as aforesaid. On the upper free end of the handle stud 116 is a flag 142 which is retained against removal by lock nuts 143. The flag 142 is keyed to the ratchet portion 119 by a pin 144 (FIG. 7), the flag 142 effectively serving as an indicator by which an operator can tell whether the flow control structure 30 is open or closed.

The adjustable orifice assembly 38 includes an orifice member 148 which is mounted in an interior wall 149 of the meter cap section 48 and is of the configuration clearly shown in FIGURES 7 and 11, including an external annular rib 150 and a frusto-conical interior wall 151. An O-ring 152 seals the orifice member 148. A cylindrical orifice spacer 154 spans a passageway 155 in the meter cap section 48 and has four equi-spaced openings 156 communicating the orifice member 148 with the passageway 155. As is clear from FIGURE 11, the orifice spacer 154 surrounds a portion of the orifice member 148 and presses against the external rib 150 thereof. The outer portion of the orifice spacer 154 is disposed within an orifice nut 158 having external threads which threadedly engage a threaded opening 159 in the meter cap section 48. The orifice nut 158 has an opening 160 in the head thereof through which extends an internally threaded barrel member 161 into abutting relationship with the outer end of the orifice spacer 154, an O-ring 162 sealing the orifice spacer 154, the orifice nut 158 and the barrel member 161. The barrel member 161 has external graduations, as illustrated in FIGURE 13, for purposes of determining the setting of the flow control structure 30, and an external annular rib or flange 163 for locking within the head of the orifice nut 158. Threadedly mounted in the barrel member 161 is a metering needle 165 of the configuration clearly shown in FIGURE 11. The metering needle 165 includes a threaded portion 166, a bullet-shaped inner end 167, a shaft portion 168, an annular groove 169 at the juncture of the shaft portion 168 and the bullet-shaped inner end 167. The groove 169 is a relief for drilling a hole for a stop pin 170, which is inserted through the needle 165 to prevent it being accidentally screwed completely out of the barrel member 161, which would allow liquid ammonia to blow out of the opening, possibly injuring the operator. The relief groove 169 also is to prevent scarring of the outer surface of the needle 165 in drilling the hole and in inserting or removing the pin 170. An O-ring 173 seals the metering needle 165. A thimble or adjusting knob 175 is secured to the outer end of the metering needle 165 by a pin 176 (FIGS. 7, 11, 14 and 15). A setscrew 177 is provided as a temporary holding device for locating the thimble 175 and the needle 166 during the process of setting and calibrating, during which it is necessary to adjust one in relation to the other. After final calibration, a hole is drilled and the roll pin 176 is driven through to hold these parts in permanent relationship to each other. The thimble 175 has markings 1 through 10 correlated with the graduations on the barrel member 161 to indicate the flow quantity through the orifice member 148.

With particular reference to FIGURES 6, 7 and 11, an inlet opening 180 is provided in the meter cap section 48 which threadedly receives a fitting 181. A passageway 182 leads from the inlet opening 180 to a space 183 above the diaphragm 75. A passage 184 connects the space 183 with the orifice member 148. The passageway 155 in the meter cap section 48 leads into a passage 186 in the body section 46 which opens into a space 187 beneath the diaphragm 75. There is an opening 188 in the diaphragm 75 permitting juncture of the passages 155 and 186. The space 187 exhausts through the valve seat unit 91 into the well 90 therebelow which connects with the passage 94 and the outlet opening 95.

In FIGURES 1–3, there is illustrated diagrammatically an operative disposition of the flow control structure 30 which is shown mounted upon the frame 192 of a simple two-wheeled applicator 193 with the pulley 54 thereof connected by a belt 194 with a pulley 195 secured to the axle or wheel of the applicator 193 for rotation therewith. In FIGURE 3, the flow control structure 30 is connected by a suitable hose 196 to a tank 197 adapted to contain liquid anhydrous ammonia, and by a suitable hose 198, manifold 199, and hose 200 to an applicator knife 201 having a suitable discharge orifice. It is understood, of course, that a battery of applicator knives 199 is used with a single flow control structure 30.

*Operation*

Compressed liquefied gas, specifically anhydrous ammonia, flows from the tank 197 and through the fitting 181 into the passage 182 and into the space 183 over the top of the diaphragm 75, then through the passage 184, through the orifice defined by the orifice member 148 and the contoured metering needle 165, through the four openings or ports 156 in the orifice spacer 154, through the passages 155 and 186 to the underside of the diaphragm 75 and out through the valve seat unit 91 into the well 90, through the outlet passage 94 and outlet opening 95 to the manifold or distributor 199, thence through the hoses 200 to the applicator knives or feet 201, normally operating to discharge the ammonia approximately 6″ below the surface of the soil.

Practically the full tank pressure is maintained through the top part of the flow control structure 30, across the diaphragm 75, up to the metering orifice determined by the metering needle 165, where it is metered. It is important to select the outlet valve at, and the hose 196 from, the tank 197 large enough in order to avoid excessive friction in the inlet line, which may cause excessive gas formation before the orifice member 148 and consequent reduction in flow rate and accuracy.

If the liquefied ammonia is maintained in the liquid state to the opening of the orifice member 148, the only variation in accuracy will be caused by the variation of the specific gravity of the ammonia with temperature, which is usually so small as to be of no consequence.

The output is controlled by the metering needle 165 setting. The inner end 167 of the metering needle 165 is contoured so that, at a given pressure, the flow through the orifice member 148 is exactly proportional to the dial setting. For example, at a dial setting of 80(8), the flow through the orifice will be exactly four times as great as a dial setting of 20(2). The equation for output in pounds of ammonia (or nitrogen) per acre is of the form:

$$\text{Lbs. per acre} = N^1 = KC/S$$

where:

K is a constant
C the dial setting
S the swath width, usually inches

From this it is seen that for a given swath width the output is directly proportional to the dial setting, regardless of speed.

Without providing some means to apply force to the diaphragm 75, the valve 80 would remain in the closed position, and the pressure above and below the diaphragm 75 would be equalized through the orifice member 148 and there would be no flow. To apply pressure to bias the diaphragm 75 open, the centrifugal governor 34 is provided, the spindle 53 being rotated by the pulley 195 attached to the ground wheel of the applicator 193 driving through the belt 194 trained around the pulley 54. The pulley ratio is selected for each size tire of the applicator 193, so that the spindle 53 is driven at exactly the same revolutions per minute for each mile per hour forward speed, regardless of the size of the tire. In one particular design, the governor spindle 53 is turned at 107.5 revolutions per minute for each mile per hour forward speed of the vehicle, which means that at eight miles per hour, the governor spindle will turn exactly 860 revolutions per minute.

As the applicator 193 starts in motion, the spindle 53 begins to rotate and the centrifugal force causes the weights 65 to swing outwardly. The cam surface at the top of each weight 65 being in contact with the cam plate follower 68, forces the cam plate follower 68 upwardly to apply a force on the diaphragm spindle 77 through the thrust bearing 69 and thrust cap 70.

The mathematical explanation infra shows that the centrifugal force developed by the weights 65 is proportional to the square of the velocity, Equation II demonstrating that the force developed is equal to a constant, multiplied by the square (or second power) of the ground speed, divided by the radius of the center of gravity of the weights 65. Equation III shows that the force of the governor 34 on the diaphragm spindle is proportional to the square of the speed.

The pressure differential developed across the diaphragm 75 is equal to the force applied by the governor 34, divided by the effective area of the diaphragm 75, which in the said one particular design is 5.714 square inches.

Therefore, the differential pressure developed across the diaphragm 75 and across the opening of the orifice member 148 is proportional to the square of the speed, and since the flow through an orifice is proportional to the square root of the pressure, the flow through the orifice, therefore, is proportional to the speed and the dial setting, as shown in Equation IX.

For the purpose of eliminating any inaccuracy caused by variation in back pressure, which would act over the area of the valve washer 83, there is provided the balance piston 100 secured to the diaphragm stem 77. If the piston 100 were omitted, it will be seen that the full inlet pressure would be acting over the upper part of the diaphragm 75, while the back pressure would be acting over that portion of the lower side of the diaphragm 75 represented in area by the inside diameter of valve seat unit 91. This might be satisfactory, if compensated for, provided that the tank pressure and the back pressure were to remain constant. However, both the tank pressure and the back pressure vary over a considerable range, which would cause the positive and unwanted liquid pressure variations to change the net force applied by the governor 34 to the diaphragm spindle 77.

The passage 88 in the diaphragm stem 77 keeps the space above the balance piston 100 at the same pressure as the outlet pressure under valve washer 83. It is, therefore, seen that the back pressure at the outlet may vary to any degree without biasing the diaphragm 75 in either direction. Also, it may be seen that the tank pressure may vary to extremes, without affecting the differential pressure applied by the governor 34. The back pressure may vary from 0 up to 40 or 50 pounds per square inch or more.

Economical operation of the ammonia applicator 193 requires that the flow control structure 30 be shut at the end of each row, so that the ammonia will not be wasted when the knives 201 are raised out of the ground for turning around. It is for this purpose that the rope-operated ratchet valve 42 is provided. In FIGURE 7, the valve 42 is shown in the open position, which leaves the upper small part of the diaphragm spindle 77 to reach a position as determined by the force of the governor 34 and the flow through the orifice member 148.

As the rope 140 is pulled, the ratchet cam member 118 is rotated 45° so that one of the four cams 121 forces the cam follower 113 down against the upper portion of the diaphragm stem 77, forcing the O-ring 82 tightly against the valve seat 92, thus shutting off the flow of ammonia. The four-winged flag 142 indicates whether the flow control structure 30 is on or off, being keyed to the cam ratchet 118.

Mathematical explanation

All of the basic equations used in this explanation are well known to engineers and technical people, and can be found in any engineering handbook in one form or another.

Orifice opening

It is noted that the metering needle 165 is so proportioned that the flow opening between it and the orifice member 148 is proportional to the setting of the knob 175. The purpose of so designing the needle 165 was to provide a flow control so that a linear equation, $$C = KN^1W$$

would provide a quickly and easily solved equation for preparing charts and for determining the setting of the knob 175.

Flow through orifice

Equation V shows the differential pressure P developed across the diaphragm 75 and opening of the orifice member 148 by the force of the governor 34 on the effective area of the diaphragm. Obviously, if a force were applied against a free sliding piston with liquid in the cylinder, the pressure developed by the liquid would be equal to the force divided by the area of the piston. Since the diaphragm 75 effective area depends both on the area of the diaphragm 75 exposed to the liquid and the area of the rigid washers 76 bolted through the center of the diaphragm 75, one must use the correct effective area as calculated and/or checked by experiment.

Mathematical explanation.—Governor

The equation for the centrifugal force of a weight rotating about an axis is:

(I) $$C.F. = MV^2/R$$

where

M is the mass of the weight
V the velocity, and
R the radius of the center of gravity Since V, the velocity of the weight is directly proportional to the ground speed of the vehicle or applicator, and since M is a constant, then (II) $$C.F. = KS^2/R$$

where S is the ground speed

Knowing the force of the weight 65 through its center of gravity, it is a simple matter in mechanics to calculate the force that would be exerted by the cam surface 66 at its point of contact with the cam follower 68.

The cam surface 66, is so proportioned that as the weight swings about pin 64, increasing or decreasing the radius R of the center of gravity, the point of contact moves out or in, respectively, increasing or decreasing the horizontal distance between the center of pin 64 and the point of contact of cam surface 66 with follower 68 in such a manner that the moment arm of the point of contact increases or decreases exactly as required, so that the force exerted due to the movement of the weight about the center of the pin 64, is the same regardless of the radius of the center of gravity of the weight about the center of the spindle 53.

To state more simply, the cam surface 66 is laid out so that the force applied by the cam surface 66 at its point of contact with the cam follower 68, due to weight swinging about the pin 64, is independent of the angular position of the weight swinging about the pin 64.

Then in this case, since the force applied to the cam follower does not vary with the radius of the weight, a selected value that is a constant may be used for the radius of the weight and the equation for the force applied by the governor then reduces to:

(III) $$C.F. = KS^2 \text{ or } F = KS^2$$

where F is the force applied to the governor spindle

Now it is seen that the force applied by the governor to the diaphragm spindle is simply a function of the square (second power) of the ground speed.

Differential pressure

If a force is applied to a piston or a diaphragm, the pressure difference developed across the piston or diaphragm will simply be equal to the force divided by the area of the piston or diaphragm:

(IV) $$P = F/A$$

where

P = pressure, p.s.i.
A = area, square inches
F = force, lbs.

If we substitute the value of the force from Equation III in Equation IV we have:

$$P = KS^2/A$$

Since A, the effective diaphragm area may be any desired value, and is a constant, the equation may now be written:

(V) $$P = K \times S^2$$

This shows that the differential pressure across the diaphragm and hence across the orifice 148 is a function of the square (second power) of the ground speed.

Flow through orifice

The well known equation for flow through an orifice is:

$$Q = C \times A \times \sqrt{H}$$

where

Q = flow, cubic feet per second
C = orifice coefficient
H = head in feet
A = area, square feet This equation may also be written:

$$G = K \times C \times A \times \sqrt{P}$$

where

K is a conversion constant
A is area, square inches
P is pressure, p.s.i.
G is flow rate, gallons per minute Since the orifice coefficient is a constant, the equation may be written:

(VI) $\quad G = KA\sqrt{P}$

Now if the expression for pressure as given in Equation V is substituted in Equation VI, we get $$G = KA\sqrt{K \times S^2}$$

which simplifies to:

(VII) $\quad G = KAS$

Equation VII shows that the flow through the orifice is proportional to the ground speed and the orifice area.

Orifice area

Since the bullet-shaped portion 167 of needle 165 is proportioned so that the flow area between needle surface 167 and bore of orifice 148 is proportional to the dial setting:

(VIII) $\quad A = K \times C$ where

A is orifice area, square inches
C is dial setting (0 to 100 divisions)
K is a constant If we substitute the value for A in Equation VIII for A in Equation VII, we get:

$$G = K(KC)S$$

or more simply (IX) $\quad G = K \times C \times S$

This shows that the flow through the orifice in gallons per minute is proportional to the dial setting and the ground speed.

Pounds per acre

Since G, gallons per minute, may be converted to pounds per minute by taking into account the specific gravity of the fluid, and since pounds per minute may be converted to pounds per acre by taking into account the acres per minute covered, depending on swath width and speed, $$N = G \times D$$

where

N = lbs. per minute
D = lbs. per gallon and $$G = N/D$$
$$N/D = KCS$$

(in Equation IX)

Since D is a constant (X) $\quad N = KDCS = KCS$ where N = lbs. per minute $$N^1 = \text{lbs./acre} = \frac{N}{\text{acres/min.}} = \frac{K \times N}{W \times S}$$

where $$N = \frac{N^1 \times W \times S}{K}$$

W = swath width-inches
S = speed, m.p.h.

Since $$\text{acres/min.} = WS/K$$

where K is a suitable conversion constant

Substituting for N in Equation X.

$$\frac{N^1 \times W \times S}{K} = KCS$$

(XI)

$$N^1 = \frac{KC \times K}{W} = \frac{K \times C}{W}$$

Which shows that the pounds of nitrogen per acre are a function of the dial setting divided by the swath width, and solving for dial setting $$C = KN^1 \times W$$

which is the same equation as shown in the preceding equations.

It is apparent that there has been provided a flow control structure which fulfills the objects and advantages sought therefor.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. In combination, a flow control structure adapted to be mounted on a movable liquid applicator and to receive and discharge anhydrous ammonia, and the like, in predetermined quantities proportional to the speed of the applicator, comprising a housing, a diaphragm in said housing, an upper chamber adapted to receive anhydrous ammonia at substantially tank pressure above and a lower chamber below said diaphragm, means for introducing anhydrous ammonia into said upper chamber, means for conducting anhydrous ammonia from said upper chamber to said lower chamber and connecting said chambers, an adjustable flow control valve in said conducting means for determining the amount of anhydrous ammonia permitted to flow to the lower chamber from the upper chamber calibrated on a basis of a predetermined number of pounds per acre, an outlet valve unit leading from said lower chamber including a valve seat and a reciprocable valve member for engaging said valve seat to close the same in one extreme position of movement and to regulate the flow of anhydrous ammonia therethrough in open positions of movement, said valve member being connected to said diaphragm for movement therewith, an outlet conduit leading from said outlet valve unit, and centrifugal means for applying a force proportional to the square of the speed of the applicator, to the diaphragm to move said valve member to an initial position for discharging anhydrous ammonia therethrough, the amount of anhydrous ammonia flowing therethrough depending upon the setting of said adjustable flow control valve, the operating position of said valve member at a given speed of the applicator being determined by a balance of the force of said centrifugal means on said diaphragm and the pressure drop across the diaphragm through the said valved conducting means, said centrifugal means including means for positive connection to a positively rotated member of an applicator on which said control structure is mounted for rotation thereby proportional to the rotation thereof, so that substantially the same amount of anhydrous ammonia per selected increment of ground as determined by said flow control valve is discharged from said flow control structure regardless of the ground speed of the applicator.

2. The combination of claim 1 and including means for offsetting variations in back pressure to insure accurate functioning of said flow control structure.

3. The combination of claim 1 and including manually actuatable means for closing and releasing said valve member.

4. In combination, a flow control structure for anhydrous ammonia, and the like, adapted for mounting on a movable applicator, comprising a housing, a chamber within said housing, a diaphragm dividing said chamber into a first space and a second space, a first passage means for admitting fluid into said first space, a second passage means for conducting fluid from said first space to said second space, an adjustable flow control valve in said second passage means adapted to be selectively set for a predetermined flow of anhydrous ammonia therethrough, a movable outlet valve means for controlling the passage of anhydrous ammonia from said second space including a reciprocatable valve and a seat, said valve being connected to said diaphragm for movement therewith, a third passage means for conducting fluid from said outlet valve means and from said structure, and a centrifugal governor mounted in said housing and operatively associated with said diaphragm and said outlet valve means for applying a force to the former proportional to the square of the speed of an applicator on which the flow control structure is mounted and to maintain a balance with the pressure drop across the diaphragm to maintain the operative discharge position of the outlet valve proportional to the linear speed of the flow control structure when said flow control structure is operatively mounted on a moving applicator so that the same amount of anhydrous ammonia per selected increment of ground as determined by said flow control valve is discharged from said flow control structure regardless of the ground speed of the applicator, said governor including means adapted to translate the linear speed of the applicator to said governor for cooperation in positioning said outlet valve means.

5. The combination of claim 4 and including means for compensating for variation in back pressure against said outlet valve means.

6. The combination of claim 4 and including manually operable means for closing said outlet valve means when desired.

7. The combination of claim 5 in which said compensating means includes a reciprocating piston member connected to said diaphragm on the side remote from said outlet valve means and located in a space unconnected with said first space, said piston having an operative surface, and passage means connecting the space in which said piston reciprocates and the space beneath said outlet valve means, whereby back pressure on said outlet valve means is equalized.

8. A flow control structure for dispensing liquid agricultural chemicals and the like under pressure adapted for mounting on a vehicle, as a wheeled applicator, comprising a housing, a diaphragm in said housing dividing the same into upper and lower chambers, a fluid inlet leading into the upper chamber, a passage connecting the upper and lower chambers, an adjustable calibrated valve in said passage, a discharge valve unit in said lower chamber secured to said diaphragm for movement therewith, a discharge passage leading from said discharge valve unit, and a centrifugal unit, as a governor, operatively mounted in respect to said housing for developing a force and for applying said force to said diaphragm for moving it and the discharge valve, said centrifugal unit having means for positive connection with the wheel and the like of an applicator for driving said centrifugal unit in direct ratio with the speed of the applicator, so that the position of the discharge valve at any speed of the applicator is a function of the force generated by the centrifugal unit and the pressure drop across the diaphragm determined by the selected position of the adjustable calibrated valve, whereby the same amount of liquid is spread per each increment of terrain regardless of the speed of the applicator.

9. In fluid flow control apparatus adapted to be inserted into fluid flow piping: differential pressure regulating means including pressure reducing passage means, differential pressure regulating means oppositely exposed to be ifluenced by high pressure above the passage means and low pressure below the same; valve means downstream of the passage means and operatively connected to the differential pressure regulating means, the valve means being movable in an opening direction by the differential pressure regulating means upon decrease in the high pressure, and vice versa, whereby to cause the low pressure above the valve means to preserve a predetermined numerical ratio to the high pressure above the passage means and to maintain a predetermined pressure drop across the passage means; and speed-responsive means to apply force to the differential pressure regulating means to modify the pressure differential between the high and low pressures, thereby to modify the pressure drop across the passage means and the quantity of flow through the same as a function of the speed of the speed-responsive means.

10. The apparatus of claim 9 wherein the differential pressure regulating means comprises a movable wall exposed on one side to high pressure and on its opposite side to low pressure, and said two sides having equal effective areas, whereby the numerical ratio is 1:1.

11. The apparatus of claim 9, with means to preset the size of the pressure reducing passage means, whereby to adjust the quantity of fluid flowing through it for any given setting of the differential pressure regulator.

12. The apparatus of claim 9, wherein the differential pressure regulating means comprises a movable wall exposed on opposite sides to the high and low pressures, respectively, and the speed-responsive means includes a rotatable shaft, centrifugal weights, and an axially movable means displaced by radial movements of the weights and connected to apply forces derived from centrifugal forces of the weights, to the movable wall.

References Cited
UNITED STATES PATENTS

| | | | |
|---|---|---|---|
| 2,623,509 | 12/1952 | Gold et al. | 137—57 X |
| 2,691,358 | 10/1954 | Peck | 137—87 X |
| 2,696,785 | 12/1954 | Blue | 111—7 X |
| 2,973,728 | 3/1961 | Garretson | 111—6 |
| 3,233,832 | 2/1966 | Hallberg | 127—53 X |

GEORGE F. MAUTZ, *Primary Examiner.*